United States Patent
Kai

(10) Patent No.: US 6,587,971 B1
(45) Date of Patent: *Jul. 1, 2003

(54) PRINT CONTROL METHOD AND PRINT CONTROL APPARATUS

(75) Inventor: Hiroshi Kai, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,623

(22) Filed: Jul. 18, 1997

(30) Foreign Application Priority Data

Jul. 31, 1996 (JP) .............................................. 8-216954
Jul. 2, 1997 (JP) .............................................. 9-176922

(51) Int. Cl.[7] ........................ H02H 3/05; H03K 19/003; H04B 1/74; H04L 1/22
(52) U.S. Cl. .......................................... 714/48; 714/47
(58) Field of Search ................................ 395/101, 107, 395/110, 114, 115, 116, 117; 358/1.14, 1.15, 1.16, 1.17, 1.12, 443, 109, 426.01, 450, 453, 494, 451; 714/48, 47, 49, 50, 51, 55; 382/232

(56) References Cited

U.S. PATENT DOCUMENTS

| | | | | |
|---|---|---|---|---|
| 3,633,178 A | * | 1/1972 | Zoft | 340/172.5 |
| 4,884,147 A | | 11/1989 | Arimoto et al. | 358/1.9 |
| 5,452,419 A | * | 9/1995 | Di Giulio et al. | 395/200.01 |
| 5,467,434 A | * | 11/1995 | Hower, Jr. et al. | 395/114 |
| 5,504,929 A | * | 4/1996 | Blair et al. | 395/885 |
| 5,566,351 A | * | 10/1996 | Crittenden et al. | 395/867 |
| 5,726,769 A | * | 3/1998 | Imai et al. | 358/442 |
| 5,943,503 A | | 8/1999 | Kai | 708/833 |

* cited by examiner

Primary Examiner—Christine T. Tu
Assistant Examiner—Guy Lamarre
(74) Attorney, Agent, or Firm—Fitzpatrick, Cella, Harper & Scinto

(57) ABSTRACT

Disclosed are a print control method and a print control apparatus capable of recognizing status information pertaining to a printer, and selecting a time interval at which the transmission of updated status information is to be requested of the printer from among a plurality of preset time intervals, in accordance with the current status information of the printer. This reduces the time lag between a change of status of the printer and the status information of the printer displayed by the print control apparatus, and avoids deterioration of the performance of the print control apparatus and the printer.

33 Claims, 16 Drawing Sheets

FIG. 7

|  | FIRST COLUMN<br>(WHEN ERROR OCCURS) | SECOND COLUMN<br>(IN NORMAL STATUS) |
|---|---|---|
| FIRST ROW<br>(IN OPERATION) | T1 | T3 |
| SECOND ROW<br>(WHILE WAITING) | T2 | T4 |

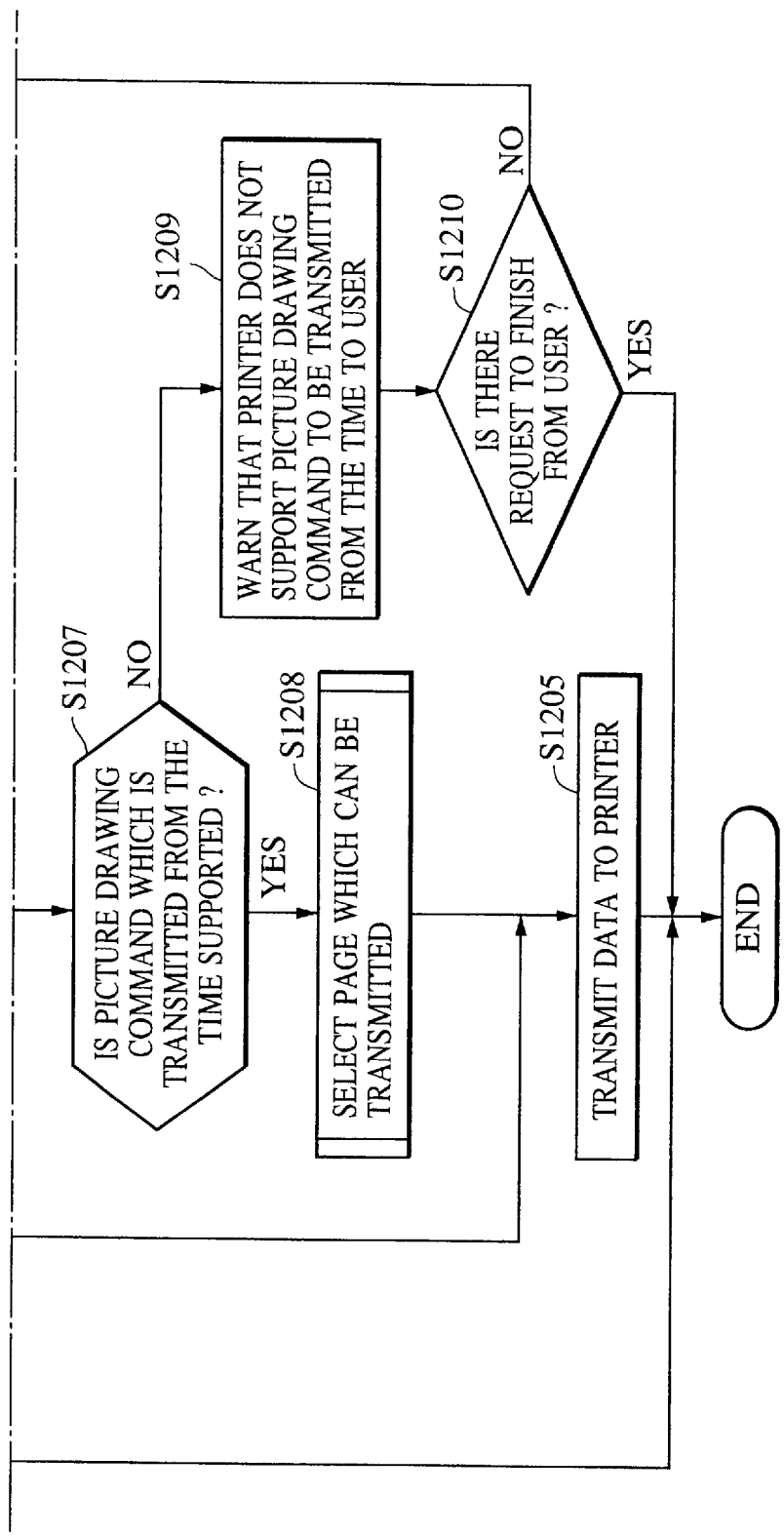

FIG. 14

| MODEL NAME OF PRINTER |
|---|
| NAME OF COMMAND SET |
| COMMAND 1 |
| COMMAND 2 |
| COMMAND 3 |
| · · · · · · |
| · · · · · · |
| (TERMINUS SYMBOL) |

PRINT CONTROL METHOD AND PRINT CONTROL APPARATUS

BACKGROUND OF THE INVENTION

1. Field of the Invention

The present invention relates to a print control method and a print control apparatus of a host computer and the like for transferring image data to a printer, and relates as well to a memory medium used by the print control method and print control apparatus.

2. Description of the Related Art

Conventionally, when image data is printed using, for example, a printer connected to a host computer, the host computer receives information as to how the printer operates, error information relating to errors such as clogging or jamming of print paper, shortage of ink and toner, and the like from the printer, and displays the received information and the like on the display unit or the like of the host computer. The host computer notifies a user of a printing status by it.

Even if the printer does not execute a printing operation, the host computer receives information such as the on-line and off-line status of the printer, whether a printer cover is opened or closed, and the like from the printer as well as displays the received information and the like on the display unit or the like of the host computer.

As described above, in order to acquire the status information of the printer, the host computer transmits a command to the printer to cause it to create the status information, further requests the printer to transmit the status information, converts the status information transmitted therefrom in response to the request into a form of characters, graphics and the like which can be displayed and displays them on the display unit and the like of the host computer. In this case, the host computer instructs the printer to transmit the status information at a preset time interval.

Conventionally, when image data is printed using, for example, a printer connected to a host computer, printed, the user selects the printer through application software or the like loaded on the host computer, and image drawing commands according to the printer are transmitted to the printer. At the time, reference is not made to the type information of the printer (i.e., the information identifying its type) connected to the host computer and what image drawing commands the printer recognizes, in many cases.

However, print control apparatuses of the conventional host computer and the like have the following problems.

First, even if a printer executes a printing operation and the status of the printer changes after a short time, the host computer requests the transmission of status information to the printer only at the preset time interval. If the preset time interval is longer than the interval over which the status of the printer changes, there arises the problem that a time lag is caused between the actual status of the printer and the status of the printer display on the display unit or the like of the host computer.

If the time interval at which the host computer requests the transmission of the status information to the printer is preset to a shorter time interval to avoid the above time lag, the host computer must process the status information from the printer at the short time interval even if the status of the printer changes relatively little, or slowly, such as when the printer is not carrying out printing operations. Thus, there is caused a problem that the efficiency of the host computer and the printer is degraded.

When the user makes a mistake in the setting of printer and designates a printer which is different from an actually connected printer in the printing operation he or she executes through application software or the like, there is a problem not only that image drawing commands which cannot be recognized by the printer are transmitted and a normal print result cannot be obtained, but also that ink, toner and the like are wasted.

To avoid the above problem, it is possible not to transmit image drawing commands if the type information of a printer connected to the host computer does not coincide with the type information of a printer selected by the user through application software or the like, but this causes the problem that the image drawing commands are not transmitted even if there is another type of printer connected which can recognize image drawing commands similar to the above image drawing commands and printing therefore could be executed normally by the lather printer; nonetheless, the user must again select a printer and execute printing operation, which renders printing unnecessarily troublesome.

Further, there can be contemplated a method such that when an image drawing command set which can be recognized by a printer connected to the host computer is compared with an image drawing command set intended to be transmitted to the printer, and it is found that they coincide with each other, image drawing commands are transmitted even if the type of the printer does not coincide with the type of a printer which is assumed by the image drawing commands to be transmitted. With this method, however, there arises a problem that when image drawing commands which are specific to the type of a printer selected by the user is used as a part of image data, the part is not properly printed.

SUMMARY OF THE INVENTION

A first object of the present invention made in view of the aforesaid problems is to provide a print control method and a print control apparatus capable of recognizing the status information of a printer, selecting a time interval at which the transmission of the status information is suitably requested of the printer, from among a plurality of time intervals which are preset in accordance with the status information of the printer, reducing a time lag between the change of status of the printer and the status information of the printer displayed by a host computer or the like as well as avoiding the deterioration of performance of the host computer and the like and the printer.

A second object of the present invention is to provide a print control method and a print control apparatus capable of recognizing what type a connected printer is, and the information of an image drawing command set to be recognized, controlling whether image drawing commands are to be transmitted or not depending upon whether or not the type of connected printer coincides with the type of printer designated by the user for the printing operation and whether or not the image drawing command set of the connected printer coincides with the image drawing command set which is intended to be transmitted, avoiding the transmission of improper image drawing commands to the printer and ensuring that proper image drawing commands are transmitted to the printer.

A third object of the present invention is to provide a memory medium capable of smoothly controlling the print control apparatus.

To achieve the first object, a print control method according to one aspect of the invention transfers image data to a printer as follows. A status request setting command is transmitted to the printer to cause it to create status information indicating the position status. The printer is requested to transmit the status information, which is received by the other party (i.e., the host computer or the like). A time interval at which the transmission of the status information is requested of the printer is controlled in accordance with the operating status of the printer.

In that print control method, the time interval control step can be performed such that the time interval is controlled in accordance with an error status of the printer.

Also, to achieve the first object, according to a print control apparatus of another aspect of the invention, a print control apparatus transfers image data to a printer by performing the method indicated above, employing suitable means for the various steps.

To achieve the second object, a print control method according to another aspect of the invention transfers image data to a printer as follows. Type information indicating what type the printer is, is acquired from the printer. The model name of the printer, included in the type information, is compared with a model name which is assumed by image drawing commands which are intended to be transmitted to the printer. The image drawing commands are transmitted to the printer or not, in accordance with the result of comparison of the model names.

Also, to achieve the second object, a print control method according to another aspect of the invention transfers image data to a printer as follows. Again, type information indicating what type the printer is, is acquired from the printer. That information includes type information indicating image drawing command set recognized by the printer; that is compared with the type information of image drawing commands which are intended to be transmitted to the printer. The image drawing commands are transmitted to the printer, or not, in accordance with the result of comparison of the command sets.

To achieve the second object, a print control method for transferring image data to a printer comprises acquiring the type information of the printer therefrom, comparing the model name of the printer (which is included in the type information acquired from the printer) with a model name which is assumed by image drawing commands which are intended to be transmitted to the printer, comparing the type information of an image drawing command set (which is included in the type information acquired from the printer) recognized by the printer with the type information of image drawing commands which are intended to be transmitted to the printer, and selecting an image page which can be recognized by the printer when the model name acquired from the printer does not coincide with the model name which is assumed by the image drawing commands which are intended to be transmitted to the printer and the type information of the image drawing command set which is recognized by the printer coincides with the type information of the image drawing commands which are intended to be transmitted to the printer.

To achieve the second object, a print control apparatus for transferring image data to a printer comprises type information acquisition means for acquiring the type information of the printer therefrom; model name comparison means for comparing the model name of the printer included in the type information acquired from the printer with a model name which is assumed by image drawing commands which are intended to be transmitted to the printer; and command transmission control means for controlling whether the image drawing commands are transmitted to the printer or not in accordance with the result of comparison of the model names.

To achieve the second object, a print control apparatus for transferring image data to a printer comprises type information acquisition means for acquiring the type information of the printer therefrom; command set comparison means for comparing the type information of an image drawing command set which is included in the type information acquired from the printer and recognized by the printer with the type information of image drawing commands which are intended to be transmitted to the printer; and command transmission control means for controlling whether the image drawing commands are transmitted to the printer or not in accordance with the result of comparison of the command sets.

To achieve the second object, another print control apparatus for transferring image data to a printer comprises type information acquisition means for acquiring the type information of the printer therefrom; model name comparison means for comparing the model name of the printer which is included in the type information acquired from the printer with a model name which is assumed by image drawing commands intended to be transmitted to the printer; command set comparison means for comparing the type information of image drawing commands set included in the type information acquired from the printer and recognized by the printer with the type information of image drawing commands intended to be transmitted to the printer; and page selection means for selecting an image page which can be recognized by the printer when the model name acquired from the printer does not coincide with the model name of a printer which is assumed by the image drawing commands intended to be transmitted to the printer and the type information of the image drawing command set which is recognized by the printer coincides with the type information of the image drawing commands intended to be transmitted to the printer.

To achieve the third object, a memory medium in which a program for controlling print control apparatus for transferring image data to printer is stored comprises a command transmission module of a command transmission step for transmitting a status request setting command to the printer to cause it to create the status information thereof; a status information request module of a status information request step for requesting the transmission of the status information of the printer thereto; a status information reception module of a status information reception step for receiving the status information transmitted from the printer; and a time interval control module of a time interval control step for controlling a time interval at which the transmission of the status information is requested to the printer in accordance with an operating status of the printer.

To achieve the third object, a memory medium in which a program for controlling a print control apparatus for transferring image data to a printer is stored comprises a type information acquisition module of a type information acquisition step for acquiring the type information of the printer therefrom; a model name comparison module of a model name comparison step for comparing the model name of the printer included in the type information acquired from the printer with a model name which is assumed by image drawing commands which is intended to be transmitted to the printer; and a command transmission control module of a command transmission control step for controlling whether the image drawing commands are transmitted to the printer or not in accordance with the result of comparison of the model names.

To achieve the third object, a memory medium in which a program for controlling a print control apparatus for transferring image data to a printer is stored comprises a type information acquisition module of a type information acquisition step for acquiring the type information of the printer therefrom; a command set comparison module of a command set comparison step for comparing the type information of an image drawing command set which is included in the type information acquired from the printer and recognized by the printer with the type information of image drawing commands which are intended to be transmitted to the printer; and a command transmission control module of a command transmission control step for controlling whether the image drawing commands are transmitted to the printer or not in accordance with the result of comparison of the command sets.

To achieve the fourth object, a memory medium in which a program for controlling a print control apparatus for transferring image data to a printer is stored comprises a type information acquisition module of a type information acquisition step for acquiring the type information of the printer therefrom; a model name comparison module of a model name comparison step for comparing the model name of the printer which is included in the type information acquired from the printer with a model name which is assumed by image drawing commands intended to be transmitted to the printer; a command set comparison module of a command set comparison step for comparing the type information of image drawing commands set included in the type information acquired from the printer and recognized by the printer with the type information of image drawing commands intended to be transmitted to the printer; and a page selection module of a page selection step for selecting an image page which can be recognized by the printer when the model name acquired from the printer does not coincide with the model name which is assumed by the image drawing commands intended to be transmitted to the printer and the type information of the image drawing command set which is recognized by the printer coincides with the type information of the image drawing commands intended to be transmitted to the printer.

BRIEF DESCRIPTION OF THE DRAWINGS

FIG. 7 is a view showing a data format of a status acquisition interval table of the print control apparatus;

FIG. 14 is a view showing a data format of a command table of image drawing commands capable of recognizing a printer controlled by the print control apparatus;

DESCRIPTION OF THE PREFERRED EMBODIMENTS

Embodiments of the present invention will be described below with reference to accompanying drawings.
(First Embodiment)

Figure 1:
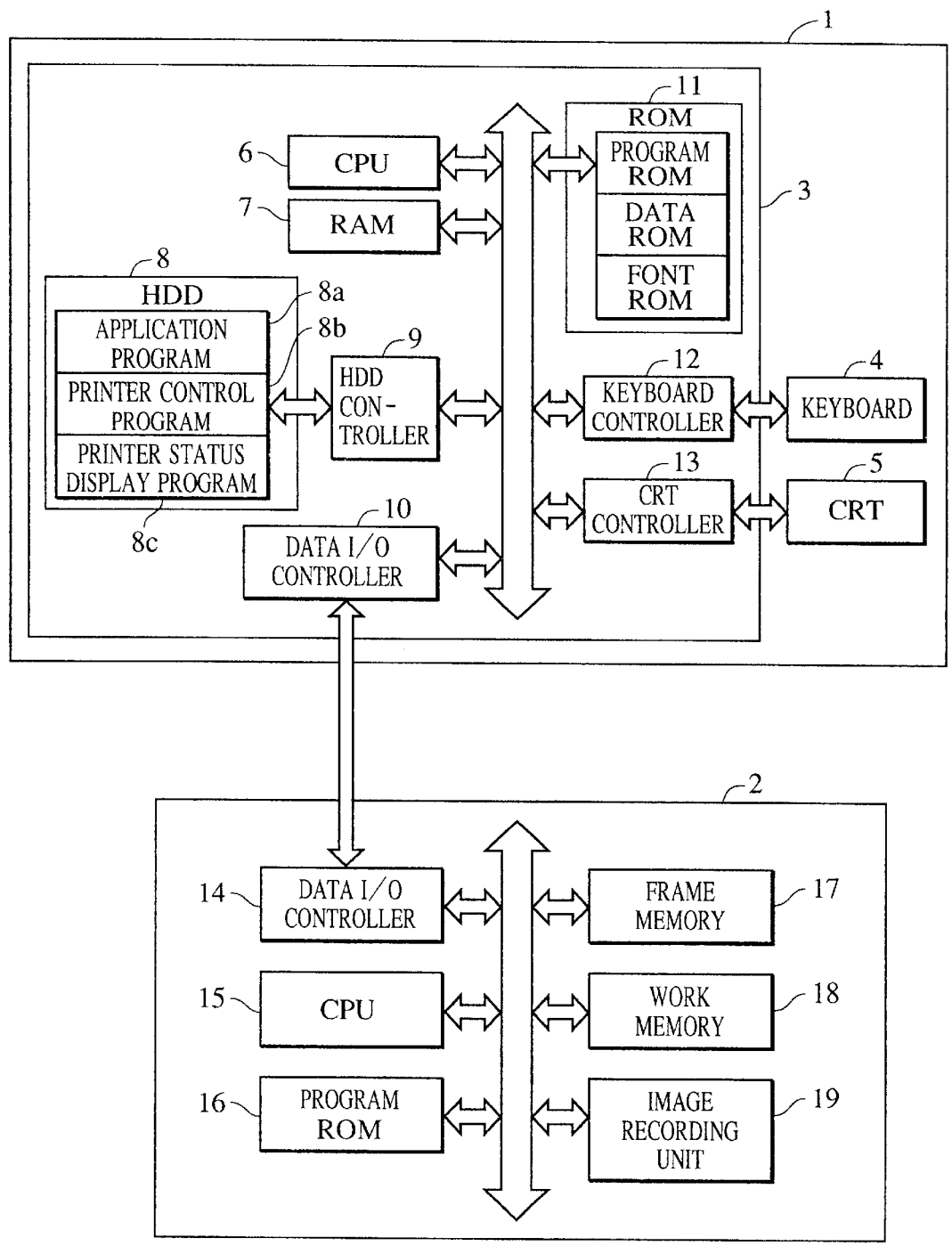
FIG. 1 is a block diagram showing the arrangement of a system having a print control apparatus according to a first embodiment of the present invention.

A first embodiment of the present invention will be described with reference to FIG. 1 to FIG. 5. FIG. 1 is a block diagram showing the arrangement of a system having a print control apparatus according to the first embodiment of the present invention. The system is composed of a host computer 1 acting as a print control apparatus and a printer 2 whose printing operation is controlled by the host computer 1.

The host computer 1 includes a host computer main body 3, and keyboard 4 and display means (a CRT, or cathode ray tube) 5. The host computer main body 3 includes a CPU (central processing unit) 6, a RAM (random access memory) 7, a hard disk (HDD) 8, a hard disk controller 9, a data I/O controller 10, a ROM (read only memory) 11, a keyboard controller 12 and a CRT controller 13. The CPU 6 controls the host computer 1 as a whole. The RAM 7 is a memory in which all the programs operating in the host computer 1 are loaded and which is used as a work memory when the programs are in operation. The hard disk 8 includes an application program storing region 8a, a printer control program storing region 8b and a printer status display program storing region 8c. Various programs such as a printer control program, a printer status display program and the like as well as data and the like which are necessary when the respective programs are operated, are stored in the hard disk 8. The hard disk controller 9 controls the hard disk 8 when it reads and writes programs and data. The data I/O controller 10 transfers commands and data for the printer 2 which have been created by the printer control program to the printer 2 and receives and temporarily stores data transmitted from the printer 2. That is, the data I/O controller 10 is connected to the printer 2 through a bi-directional data communication interface (IEEE 1284) and transmits data to and receives data from the printer 2. The ROM 11 is a memory in which are stored programs and data necessary to various basic operations such as the execution of various programs on the host computer 1, the control of various controllers and the like, as well as font data and the like used when information is displayed on the CRT 5. The keyboard controller 12 controls the key input executed through the keyboard 4 connected to the host computer main body 3. The CRT controller 13 controls the display on the display CRT 5 connected to the host computer main body 3. The keyboard 4 includes a multiplicity of keys for inputting various kinds of information therethrough and is connected to the keyboard controller 12. The CRT 5 displays various kinds of information on a screen and is connected to the CRT controller 13.

The printer 2 includes a data I/O controller 14, a CPU 15, a program ROM 16, a frame memory 17, a work memory 18 and an image recording unit 19. The data I/O controller 14 receives image data and the like which has been transferred from the host computer 1 to the printer 2 and transfers information from the printer 2 to the host computer 1. The CPU 15 controls the printer 2 as a whole. The program ROM 16 has a program stored therein which executes a series of printing operations for outputting image data received from the host computer 1. The frame memory 17 stores an image pattern created by the program in the program ROM 16. The work memory 18 is a memory used for various kinds of image recording processing, including image data drawing processing. The image recording unit 19 records the image pattern stored in the frame memory 17 on paper, preferably as a binary record pattern (i.e., a pattern of binary-valued pixels), although other types of printers can be used. Further, the printer 2 supports a status request setting command for requesting the status thereof (including, e.g., an operating status, error status and the like). When the printer 2 receives that command, it is set to create status information indicating its status, such as whether it is executing a printing operation, or a paper discharge operation, or is not executing any of these or predetermined error code, when an error occurs in the printer 2, the code corresponding to the particular error which has occurred. A data format of the status information of the printer 2 to be created is arranged as printer status information as shown, for example, in FIG. 4.

The data I/O controller 10 of the host computer main body 3 constitutes command transmission means for transmitting the status request setting command to the printer 2 and also constitutes status information reception means for receiving the status information representing the operating status, error status and the like of-the printer 2 transferred therefrom.

The CPU 6 of the host computer main body 3, among its many other functions, serves as time interval control means for controlling a time interval at which the transmission of the status information is requested of the printer 2 in accordance with the status of the printer 2 judged from previously-received status information. The host computer 1 outputs the image of data composed, typically of a mixture of characters, graphics and images which have been created by the application program and the like in the hard disk 8, to the printer 2 connected to the host computer 1 through the printer control program in the hard disk 8. Further, the host computer 1 displays the status information of the printer 2 on the CRT 5 through the CRT controller 13 using the printer status display program in the hard disk 8. The printer 2 receives image data from the host computer 1 and records the image on recording paper. The printer 2 receives the command to create the status information from the host computer 1 and creates the printer status information in response to that command. Further, the printer 2 receives from the host computer 1 a request for transmitting the printer status information and transmits the information to the host computer 1.

Next, operation of the printer status display program-operating on the host computer 1 of the system arranged as described above will be described with reference to the flowchart of FIG. 2.

Figure 2:
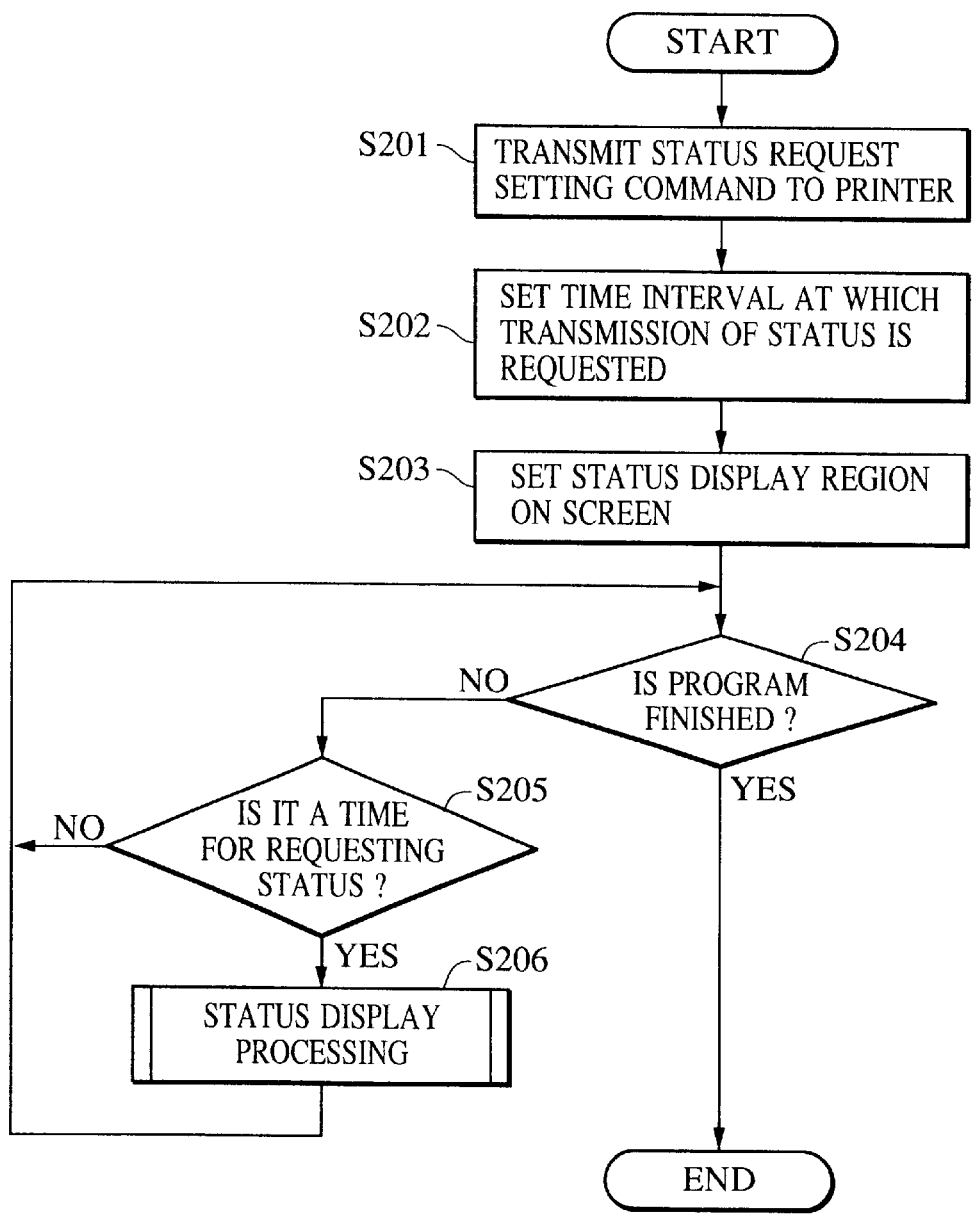
FIG. 2 is a flowchart showing a process for controlling printer status display processing operation executed by the host computer of the system.

In FIG. 2, first, the host computer 1 transmits the status request setting command to the printer 2 at step S201. At step S202, the initial value of a time interval at which the host computer 1 requests the transmission of the status information to the printer 2 is recorded in a status acquisition interval recording region which is formed in the RAM 7 of the host computer main body 3 as a region in which that length of that time interval is to be stored. At step S203, a status display region is set on the CRT 5 of the host computer 1. The status display region displays the operating status and error status of the printer 2 using a character train, a bit map image and the like.

Next, whether the user requests to terminate the program or not, is determined at step S204. When the user requests termination of the program, the processing operation is ended without executing further processing, and otherwise, the process goes to next step S205. At step S205, it is determined whether or not time equal to the value recorded in the status acquisition interval recording region has elapsed since the transmission of the status information was requested of the printer 2 last time. When that time has elapsed, status display processing is executed at next step S206, and then step S204 and the subsequent steps are repeated, whereas, when less time has elapsed, step S204 and the subsequent steps are repeated without step S206.

As described above, the print control apparatus of the first embodiment is arranged such that step S204 to step S206 are repeated until the user requests the finish of the program after the completion of the processing from step S201 to step S203.

Next, the status display processing operation executed at step S206 will be described with reference to the flowchart of FIG. 3.

Figure 3:
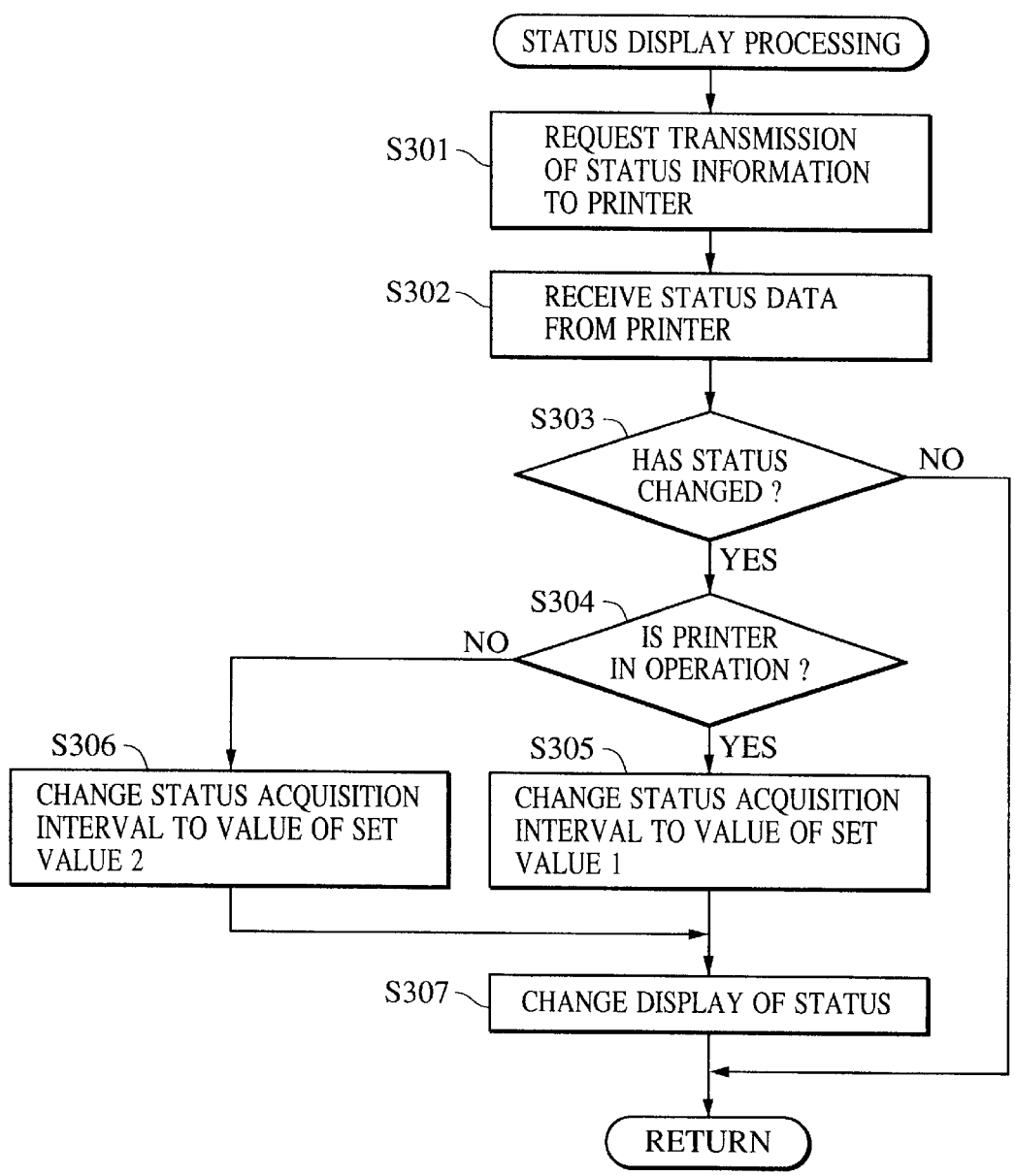
FIG. 3 is a flowchart showing a process for controlling status display processing operation executed by the host computer of the system.
Figure 4:
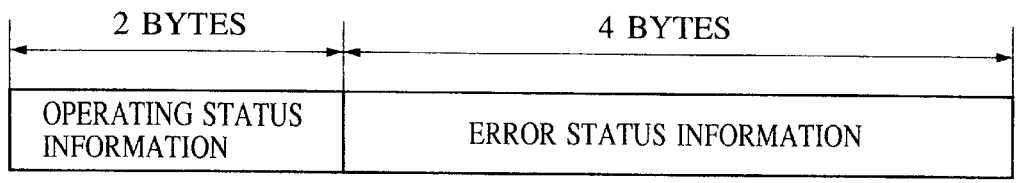
FIG. 4 is a view showing a data format of printer status information in the host computer of the system.

In FIG. 3, first, the printer 2 is requested to transmit the status information for the examination of the operating status and the error status thereof at step S301. The request is executed by controlling a signal line so that a compatibility mode for executing communication from the host computer 1 to the printer 2 is shifted to a nibble (byte) mode for executing communication from the printer 2 to the host computer 1. After the printer 2 receives the command at step S201, if it has status data to be transmitted, it transmits the data each time the shift to the nibble mode is executed. The host computer 1 receives and reads the status information transferred from the printer 2 at step S302. As shown in FIG. 4, the status information includes the operating status information and error status information of the printer 2 and the values thereof are used in the subsequent processing.

As described above, the transmission of the status information can be requested even if the printer 2 is in an error state by requesting the transmission of it by setting a specific signal line to a specific status in place of the use of a command.

Note that the operating status information field in FIG. 4 stores two-byte character trains which represent four types of operating statuses, that is, paper feed, print, paper discharge and wait. Further, the error state information field in FIG. 4 stores a four-byte error code which is inherent to the printer 2 to represent the types of errors arisen in the printer 2 or a four-byte code which represents that no error state exists.

When the status information is stored at step S302, the process goes to next step S303 where it is determined whether-or not the content of the status information received from the printer 2 at step S302 is changed from the content which is displayed on the CRT 5 of the host computer 1 as the present status of the printer 2. This determination is carried out to prevent the execution of subsequent processing such as the alteration of display of the status and the like when the status has not changed.

At step S303, when the status information received from the printer 2 is the same as the current printer status displayed on the CRT 5 of the host computer 1 at step S303, the status display processing is interrupted, and the process goes to step S203 in FIG. 2. But at step S303, when the status information received from the printer 2 is different from the printer status information displayed on the CRT 5 of the host computer 1, the process goes to step S304. At step S304, a determination is made as to whether or not the content of the status information which has been received from the printer 2 and stored in the operating status field represents that the printer 2 is in any of the operations of paper feed, print and paper discharge, from which a conclusion is drawn as to whether the printer 2 is in printing operation or in a waiting status. In addition, it is also determined whether the printer 2 is in an error state or not. When the content in the operating status field represents paper feed, print or paper discharge, or when the printer 2 is in an error state, the process goes to step S305. Further, when the content in the operating status field represents that the printer 2 is in the waiting status, the process goes to step S306.

Figure 5:
FIG. 5 is a view showing a data format of status acquisition interval data of the print control apparatus.

At step S305, the content of the status acquisition interval recording region in the RAM 7 of the host computer main body 3 is changed to the value (for example, 0.5 second) of the set value 1 of the status data acquisition interval data shown in FIG. 5 and the process goes to step S307. Further, at step S306, the content of the status acquisition interval recording region in the RAM 7 of the host computer main body 3 is changed to the value (for example, 2 seconds) of the set value 2 of the status acquisition interval data shown in FIG. 5 and the process goes to step S307.

Since the value of set value 1 in FIG. 5 is smaller than set value 2, when the printer 2 is in operation and the status thereof frequently changes or when the printer 2 is in an error state, the host computer 1 acquires the status information of the printer 2 at a short time interval in accordance with the status of the printer 2. Further, when the printer 2 is in a waiting state and its status does not so frequently change (as compared with when in operation or not in an error state), the time interval at which the host computer 1 acquires the status information from the host computer 1 is set longer, so that the performance of the host computer 1 and the printer 2 does not deteriorate.

At step S307, the content of the status information received from the printer 2 at step S302 is displayed on the CRT 5 of the host computer 1, and thereafter the process returns to step S204 in FIG. 2.

As described above, when the host computer 1 requests the transmission of the status information to the printer 2 by transmitting the status request setting command thereto, receives the status information to the printer 2 and displays the content of the status information on the CRT 5 as the operating status and error status of the printer 2, the time interval at which a series of operations is repeated for the host computer 1 to request the transmission of the status information from the printer 2 and to receive a response therefrom is set to the preset short time interval when the printer 2 is in operation or to the preset long time interval when the printer 2 is in the waiting state, based on whether the printer 2 is in the operation of paper feed, printing of paper discharge, or in the waiting state. As a result, when the printer 2 is in operation and its status frequently changes, it is possible to renew the display of the status of the printer 2 at the short time interval in accordance with the frequent change of the status, whereas when the printer 2 is in the waiting state and the status thereof changes relatively less frequently, the frequency at which the display of the status is renewed is reduced. In this way the host computer 1 and the printer 2 can be controlled to prevent the deterioration of the performance thereof.

(Second Embodiment)

Figure 6:
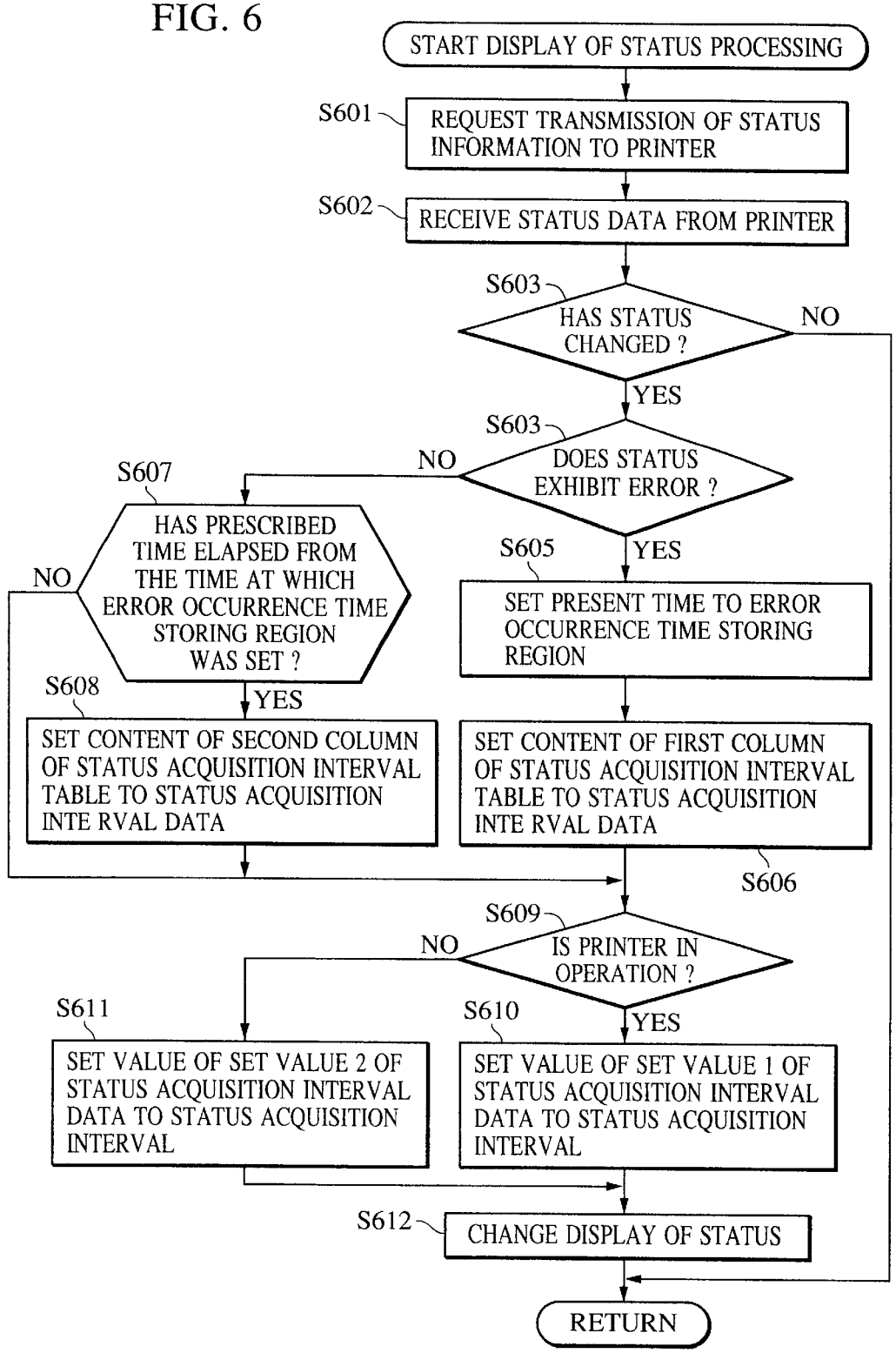
FIG. 6 is a flowchart showing a process for controlling status display processing operation executed by a print control apparatus according to a second embodiment of the present invention.

A second embodiment of the present invention will be described with reference to FIG. 6 and FIG. 7. The aforesaid first embodiment is arranged such that the time interval at which the series of operations is repeated for the host computer 1 to request the transmission of the status information from the printer 2 and to receive the status information as the response thereto from the printer 2, is changed based on whether the printer 2 in the operation of paper feed, printing or paper discharge. In addition to the above, the second embodiment is arranged such that when an error occurs in the printer 2, the time interval at which the series of operations is repeated for the host computer 1 to request the transmission of status information from the printer 2 and to receive the response as the status information thereof from the printer 2, is set shorter than that at which the above series of operations is repeated when no error occurs. As a result, since the display of the status on the CRT 5 can be renewed at the shorter time interval, the user can promptly cope with the error of the printer 2.

Note that since the system including a print control apparatus according to the second embodiment is the same as that of the first embodiment shown in FIG. 1, the second embodiment will be described using FIG. 1.

Status display processing operation of the print control apparatus according to the second embodiment will be described with reference to the flowchart in FIG. 6. In FIG. 6, first, the host computer 1 requests the printer 2 to transmit status information to examine the operating status and error status—(i.e., identification of error state, if any) of the printer 2 at step S601. At step S602, the host computer 1 receives and reads the status information transferred from the printer 2. The status information includes the operating status and error status of the printer 2 as shown in FIG. 4, and the values shown in FIG. 4 will be used thereafter.

When the status information is stored at step S602, it is determined at step S603 whether or not the status information received from the printer 2 at step S602 is changed from the content displayed on the CRT 5 of the host computer 1 as the status of the printer 2 at present. This determination is carried out to prevent the execution of the subsequent processing for altering the display of the status when the status does not change.

At step S603, when the status information received from the printer 2 is the same as the content displayed on the CRT 5 of the host computer 1 as the status of the printer 2 at present at step S603, the status display processing is interrupted and the process goes to step S203 in FIG. 2. Whereas, at step S603, when the status information received from the printer 2 is different from the content displayed on the CRT 5 of the host computer 1 as the status of the printer 2 at present, the process goes to step S604. At step S604, it is determined whether or not the content of the status information which has been received by the host computer 1 from the printer 2 and stored in the error status field has a value showing the occurrence of error or a value showing the occurrence of no error, to know whether the printer 2 is in an error state or not. When the content has a value showing the occurrence of an error, the process goes to step S605, whereas when the content has the value showing the occurrence of no error, the process goes to step S607, respectively.

When the content of the status information in the error status field shows that the printer 2 is in an error state at step S604, first, the present time is set in an error occurrence time storing region formed in the RAM 7 of the host computer main body 3 at step S605, and the process goes to the next step, S606. At step S606, the first column of the status acquisition interval table shown in FIG. 7 is selected, the content of the first column is set to the field of the set value 1 of the status acquisition interval data shown in FIG. 5, and the content of the second column is set in the field of the set value 2 thereof, respectively, and then the process goes to step S609.

When the content of the status information in the error status field shows an error in the printer 2 at step S604, first, the error occurrence time storing region formed in the RAM 7 of the host computer main body 3 is compared with the present time in step S607, thereby to determine whether or not a prescribed time set in a prescribed time storing region formed in the RAM 7 of the host computer main body 3 has elapsed from the time set in the error occurrence time storing region. When it is determined that the prescribed time has elapsed, the process goes to the next step, S608, whereas when the prescribed time has not yet elapsed, the process goes to step S609 by skipping step S608.

At step S608, the second column of the status information interval table shown in FIG. 7 is selected, the content of the first line thereof is set in the field of the set value 1 of the status acquisition interval data shown in FIG. 5, and the content of the second line thereof is set in the field of the set value 2 of the status acquisition interval data shown in FIG. 5, respectively, and the process goes to step S609.

The status acquisition interval table shown in FIG. 7 is located in a status acquisition interval table storing region formed in the RAM 7 of the host computer main body 3 and serves as a region for storing a status acquisition interval when the printer 2 is in operation and a status acquisition interval when the printer 2 is in the waiting state, as to a case that an error condition exist in the printer 2 and a case that no such condition exists therein. When the status acquisition intervals stored therein are represented by T1, T2, T3 and T4 as shown in FIG. 7, they are preset such that T1 is smaller than T2, T3 is smaller than T4, T1 is smaller than T3 and T2 is smaller than T4.

At step S609, it is determined whether the printer 2 is in the operation of paper feed, printing or paper discharge, or in the waiting state, with reference to the operation status field of the status information of the printer 2 received by the host computer 1 from the printer 2 in step S602. When the printer 2 is in operation,.the process goes to step S610, whereas when the printer 2 is in the waiting state, the process goes to step S611.

In step S610, the content of the status acquisition recording region in the RAM 7 of the host computer main body 3 is changed to the value of the set value 1 of the status acquisition interval data shown in FIG. 5, and the process goes to step S612. Further, in step S611, the content of the status acquisition recording region in the RAM 7 of the host computer main body 3 is changed to the value of the set value 2 of the status acquisition interval data shown in FIG. 5, and the process goes to step S612. That is, when an error occurs in the printer 2, a status display is renewed at a time interval which is shorter than that at which the status display is renewed when no error occurs in the printer 2. Further, when the printer 2 is in any operation of the paper feed, print and paper discharge, the time interval at which the status display is changed is made shorter than that at which the status display is changed when the printer 2 does not carry out any of the operations.

In step S612, the content received from the host computer 1 at step S602 is displayed on the CRT 5 of the host computer 1, and thereafter the process returns to step S204 in FIG. 2.

As described above, depending upon whether an error occurs in the printer 2 or not, when an error occurs therein, the time interval at which a series of operations is repeated for the host computer 1 to request the transmission of status information from the printer 2 and to receive a response therefrom, is set shorter than that at which the series of operations is repeated when no error occurs. As a result, since the status display is renewed at a shorter time interval when an error occurs, the user can promptly cope with an error in the printer 2.

Further, even if the user does not properly cope with the error in the printer 2 and the error recurs just after it has temporarily been resolved, the status is promptly displayed, thereby to prompt the user to cope with the error by continuously using the short time interval at which status information has been acquired, until a predetermined period of time elapses after the error in the printer 2 has been properly resolved.

(Third Embodiment)

Figure 8:
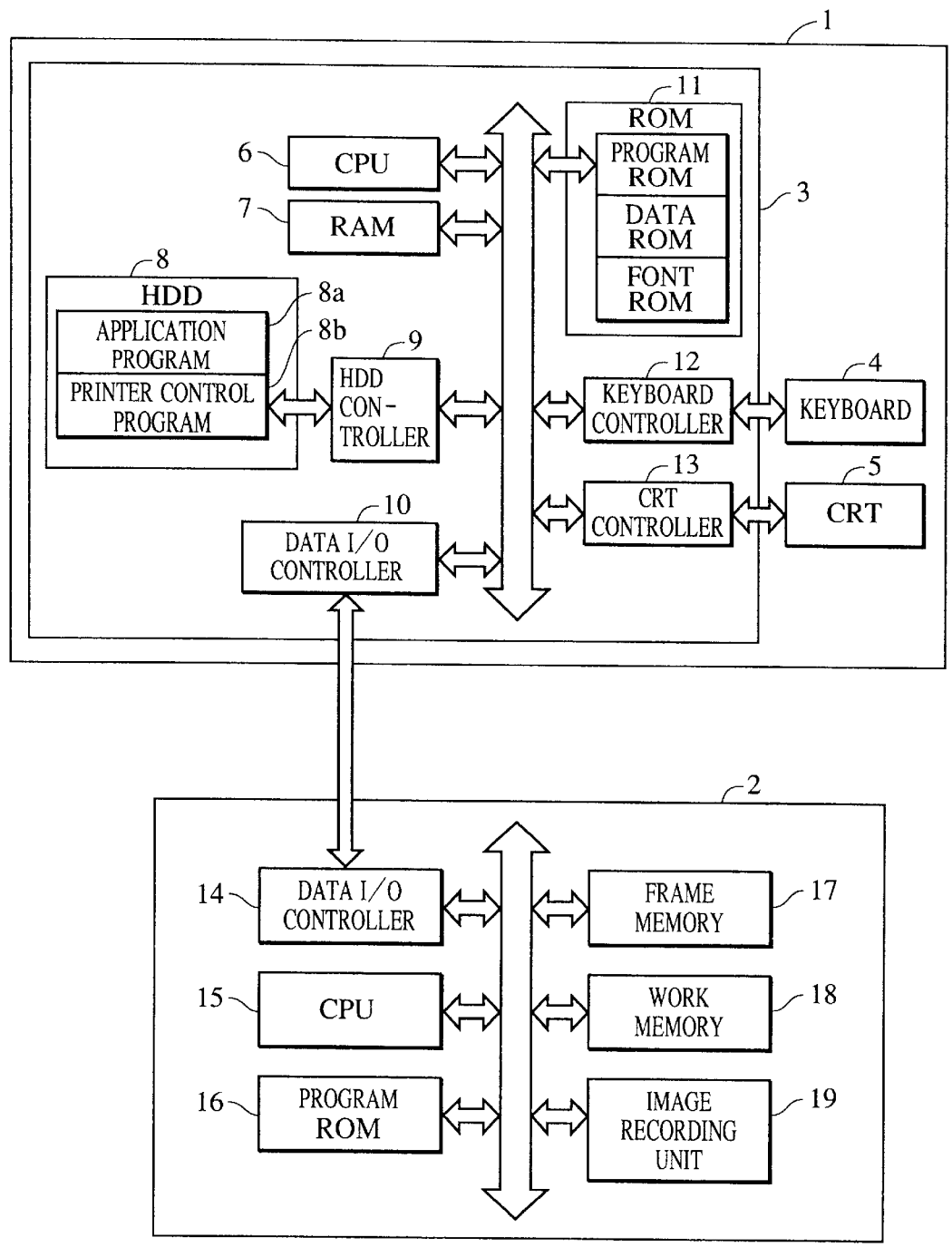
FIG. 8 is a block diagram showing the arrangement of a system having a print control apparatus according to a third embodiment of the present invention.

A third embodiment of the present invention will be described with reference to FIG. 8 to FIG. 11. FIG. 8 is a block diagram showing the arrangement of a system having a print control apparatus according to the third embodiment of the present invention. In FIG. 8, the same numerals as used in FIG. 1 are used to denote the same parts. The arrangement shown in FIG. 8 is different from that shown in FIG. 1 in the points that the printer status display program storing region 8c of the hard disk 8 in FIG. 1 is absent from FIG. 8; the printer 2 receives a request for transmitting type information and the like of the printer 2 from the host computer 1 and transmits that information to the host computer 1; the data I/O controller 10 of the host computer main body 3 serves as printer information acquisition means for acquiring the type information and the like from the printer 2; the CPU 6 of the host computer main body 3 serves as printer type comparison means for comparing the printer type information acquired from the printer 2 with the printer type which is assumed by image drawing commands which the host computer 1 intends to transmits to the printer 2; and the CPU 6 of the host computer main body 3 serves as command transmission control means for controlling whether the image drawing commands are to be transmitted to the printer 2 or not in accordance with the result of comparison of the printer types.

Next, operation of a printer control program operating on the host computer 1 of the system according to the third embodiment arranged as described above, will be described with reference to the flowchart in FIG. 9.

Figure 9:
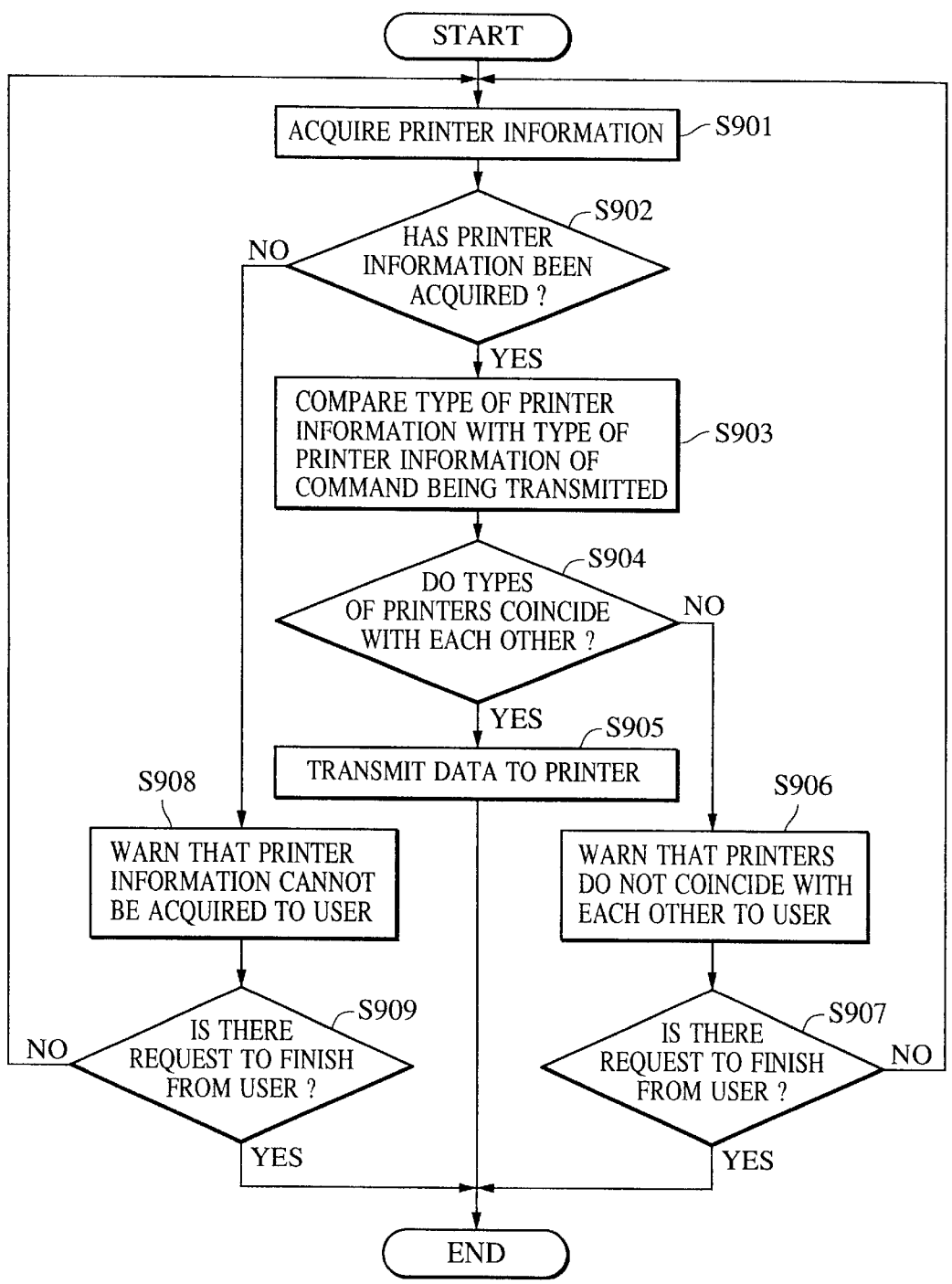
FIG. 9 is a flowchart showing a process for controlling printer control operation executed by the print control apparatus.
Figure 10:
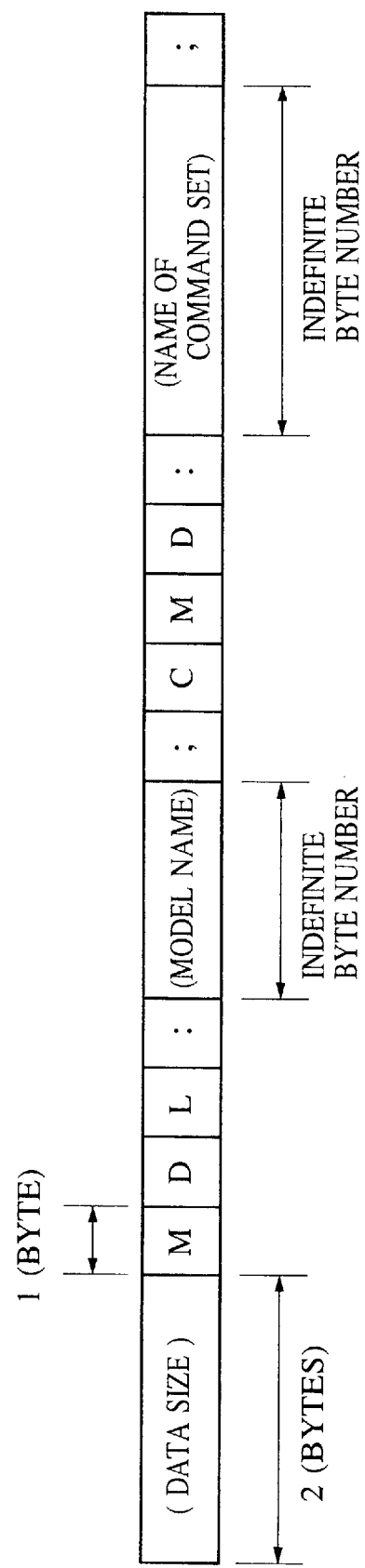
FIG. 10 is a view showing a data format of type information of the print control apparatus.

In FIG. 9, first, the host computer 1 acquires the printer type information of the printer 2 therefrom at step S901. FIG. 10 shows a data format of the printer type information. Next, it is determined in step S902 whether the printer type information of the printer 2 has been acquired or not. When it has been acquired, the process goes to step S903, whereas when it has not been acquired, the process goes to step S908, respectively. In step S903, reference is made to the portion, which shows the model name of the printer 2, of the printer type information of the printer 2 having been acquired at step S901 and the model name of the printer 2 is compared with the model name of a printer which is assumed by the image drawing commands which the host computer 1 intends to transmits to the printer 2. Next, whether the model names of the printers compared in step S903 coincide with each other or not is determined in step S904. When the mode names of the printers coincide with each other, the process goes to step S905, whereas when they do not coincide with each other, the process goes to step S906, respectively. Since the image drawing commands intended to be transmitted is suitable for the printer 2, in step S905, the image drawing commands are transmitted to the printer 2, and then the processing outer periphery is finished. Further, there is possibility in step S906 that the image drawing commands intended to be transmitted are not suitable for the printer 2, and in such case, this fact is conveyed in a warning to the user, and the process goes to step S907. In step S907, determination is made as to whether the user requests to interrupt the print processing or not. When the user requests the interruption of the print processing, the processing operation is ended without carrying out further processing. When the user does not request the interruption of the print processing, step S901 and the subsequent steps are repeated.

Since the processing of step S908 is carried out when the printer type information of the printer 2 cannot be acquired therefrom, the fact is conveyed as a warning to the user, and a determination is made as to whether the user requests to interrupt the print processing or not, in the next step, S909. When the user requests the interruption of the print processing, the processing operation is ended; whereas, when the user does not request the interruption of the print processing, step 901 and the subsequent steps are repeated.

As described above, when the host computer 1 transmits the image drawing commands to the printer 2, the host computer 1 acquires the printer type information from the printer 2, and the portion of the type information that shows the model name of the printer 2, is compared with the model name of a printer which is assumed by the image drawing commands intended to be transmitted. When the model names do not coincide with each other, the transmission of the image drawing commands is prevented so as to avoid the waste of print paper, ink, toner and the like which would be caused by the transmission of image drawing commands unrecognizable by the printer 2.

(Fourth Embodiment)

Figure 11:
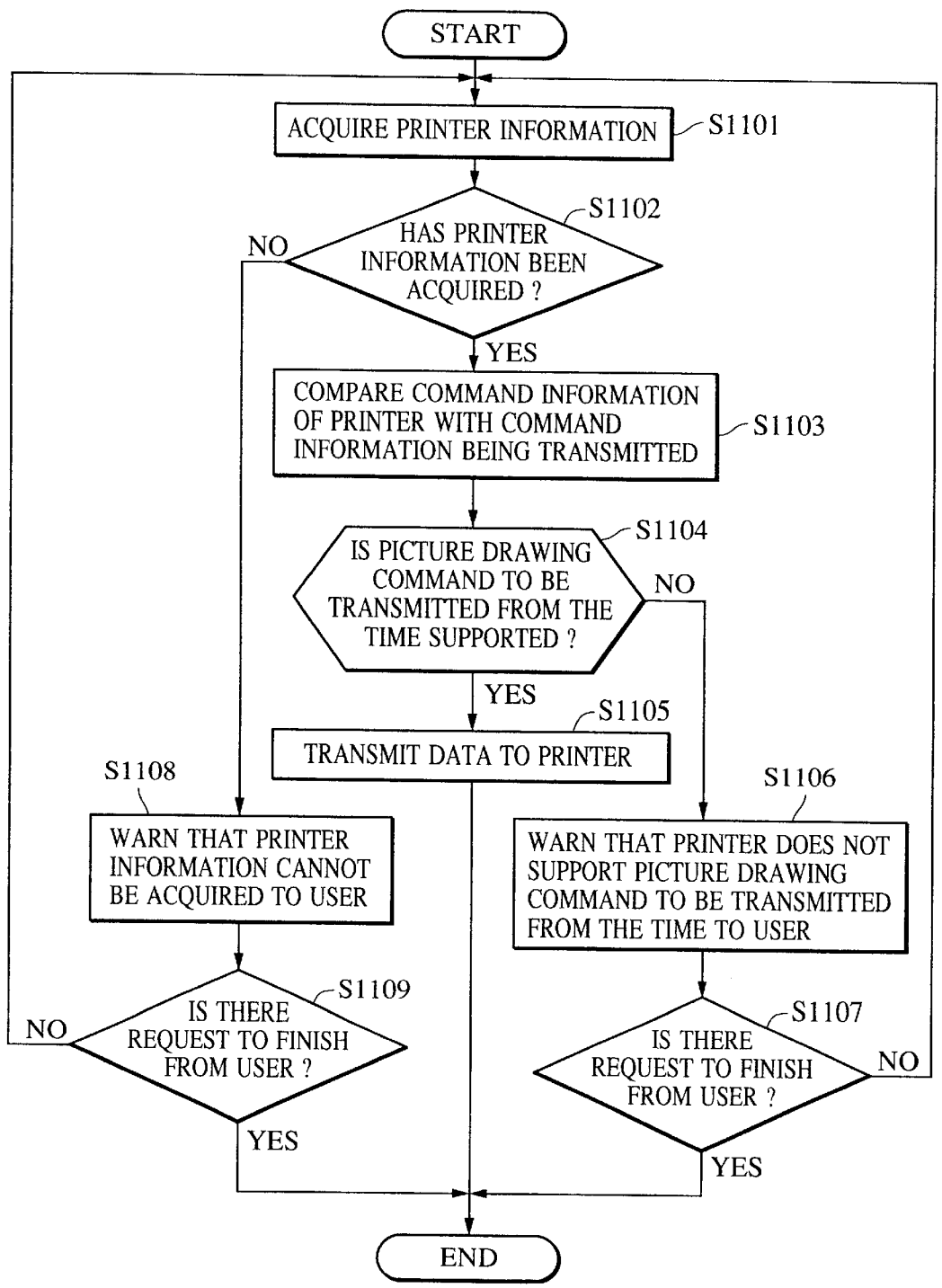
FIG. 11 is a flowchart showing a process for controlling printer control operation executed by a print control apparatus according to a fourth embodiment of the present invention.

A fourth embodiment of the present invention will be described with reference to FIG. 11. Since the system including a print control apparatus according to the fourth embodiment is the same as that of the third embodiment shown in FIG. 8, the fourth embodiment will be described using FIG. 8.

Operation of a printer control program operating on the host computer 1 of the print control apparatus according to the fourth embodiment will be described with reference to the flowchart of FIG. 11. In FIG. 11, first, the host computer 1 acquires the printer type information of the printer 2 therefrom in step S1101. In step S1102, a determination is made as to whether the printer type information of the printer 2 has been acquired or not. When the printer type information of the printer 2 has been acquired, the process goes to step S1103, whereas when it has not been acquired, the process goes to step S1108, respectively. In step S1103, reference is made to the portion of the type information acquired in step S1101 that shows the type information of an image drawing command set (version, level) recognized by the printer 2, and the type of the image drawing command set is compared with the type of image drawing commands which the host computer 1 intends to transmit to the printer 2. Next, it is determined in step S1104 whether the type of the image drawing command set coincides with the type of the image drawing commands in the above comparison. When they coincide with each other, the process goes to step S1105, whereas when they do not coincide with each other, the process goes to step S1106, respectively.

Since processing in step S1105 is carried out when the image drawing commands intended to be transmitted are supported by the printer 2, the image drawing commands are transmitted to the printer 2 in step S1105, and then the processing operation is finished. Since processing in step S1106 is carried out when the image drawing commands intended to be transmitted are not supported by the printer 2, this fact is conveyed as a warning to the user in step S1105, and the process goes to the next step, S1107. In steps 1107, a determination is made as to whether the user requests to interrupt the print processing or not. When the user requests the interruption of the print processing, the processing operation is ended without carrying out further processing, whereas, when the user does not request the interruption of the print processing, step S1101 and the subsequent steps are repeated.

Since processing in step S1108 is carried out when the printer type information cannot be obtained from the printer 2, that fact is conveyed as a warning to the user in step S1108. In the next step, S1109, a determination is made as to whether the user requests to interrupt the print processing or not.

When the user requests interruption of the print processing, the processing operation is ended, whereas, when the user does not request interruption of the print processing, step S1101 and the subsequent steps are repeated.

As described above, when the host computer 1 transmits the image drawing commands to the printer 2, the host computer 1 acquires the printer type information from the printer 2 and compares the type of the image drawing command set which is included in the thus acquired printer type information and recognizable by the printer with the type of image drawing commands which are intended to be transmitted. When the types of the image drawing command sets do not coincide with each other, transmission of the image drawing commands is prevented, so as to avoid the waste of print paper, ink, toner and the like which would be caused by the transmission of image drawing commands unrecognizable by the printer 2.

(Fifth Embodiment)

Figure 12A:
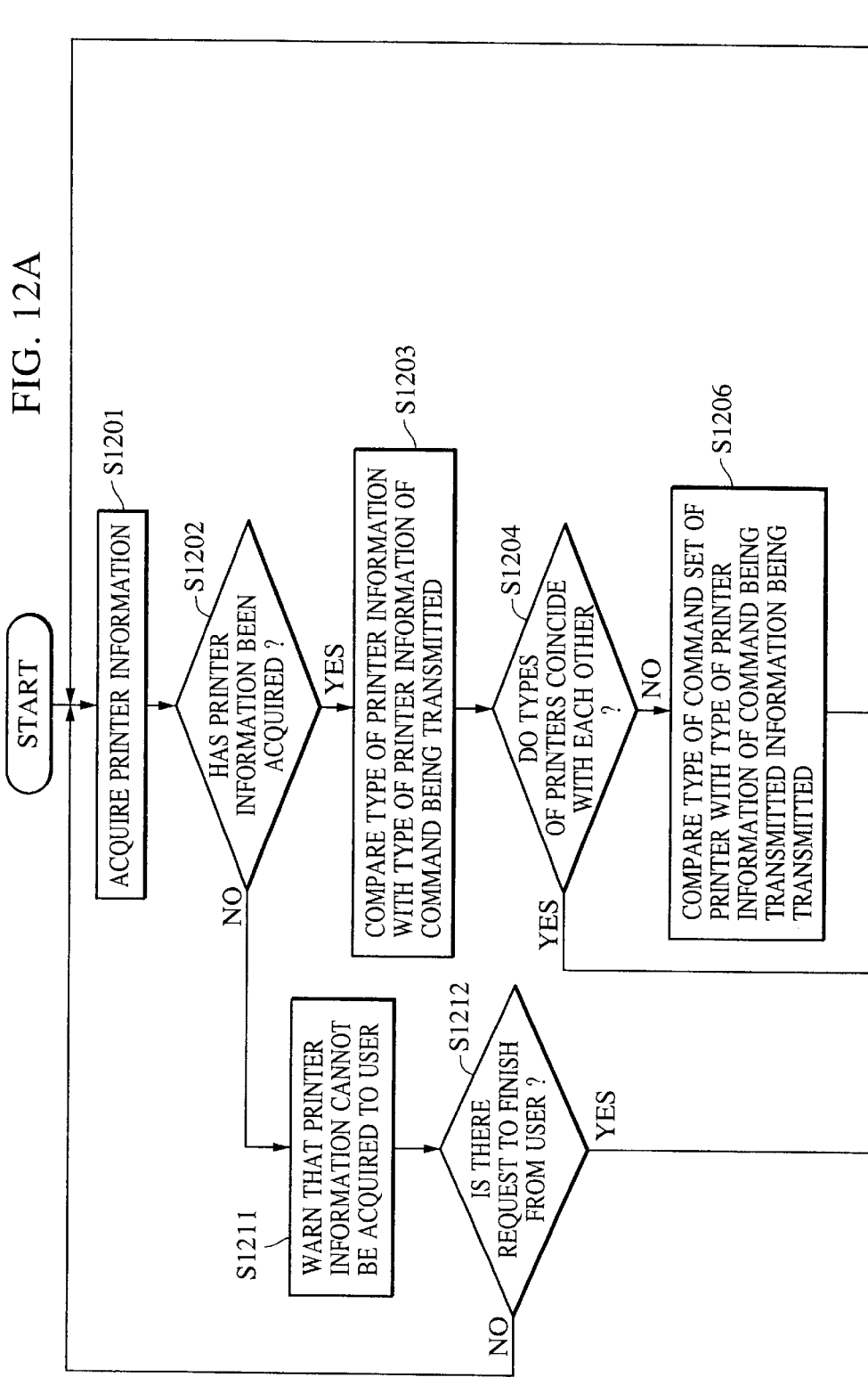
FIG. 12 is a flowchart showing a process for controlling printer control operation executed by a print control apparatus according to a fifth embodiment of the present invention.
Figure 13:
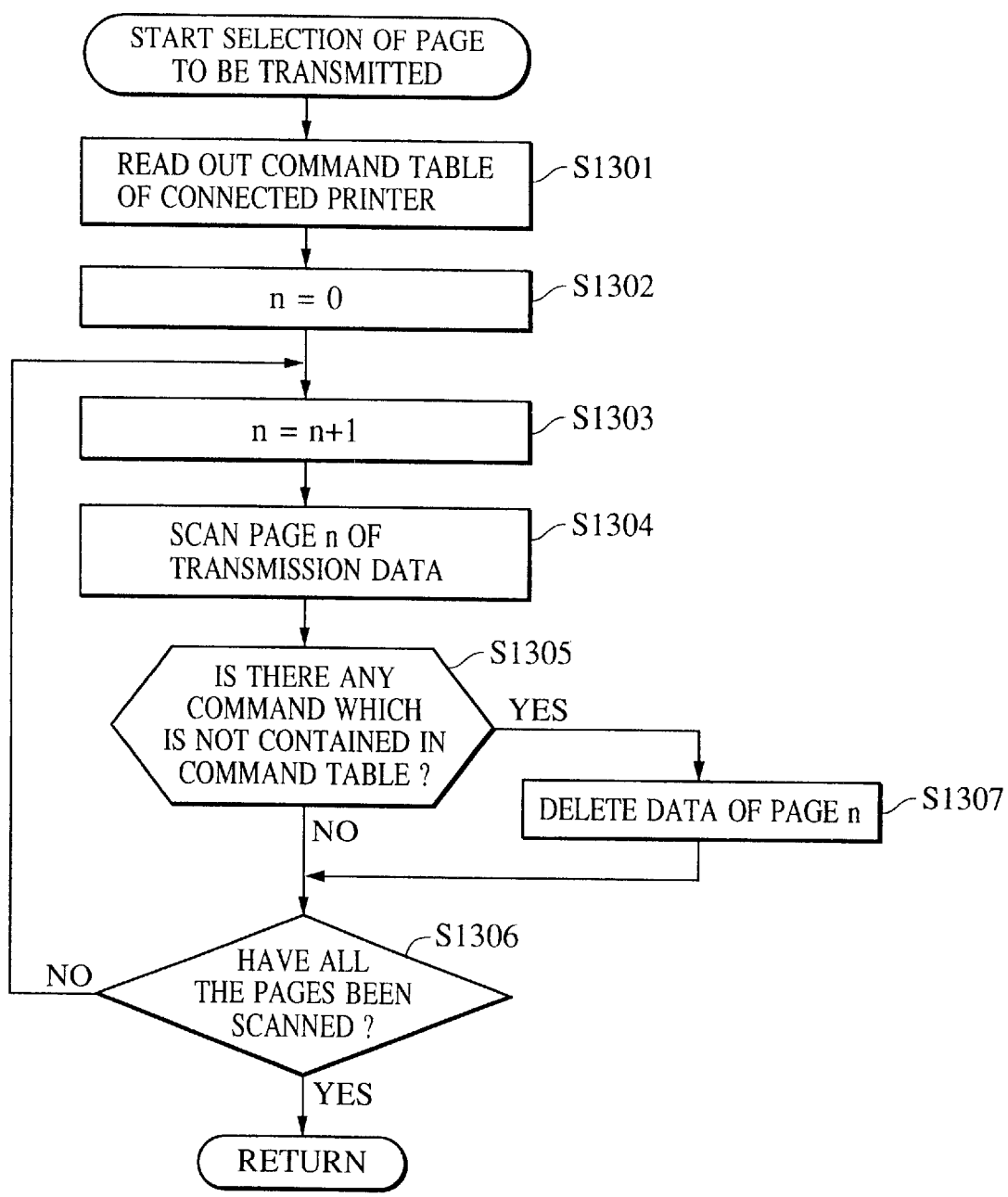
FIG. 13 is a flowchart showing a process for controlling transmission page selection processing operation executed by the print control apparatus.

A fifth embodiment of the present invention will be described with reference to FIG. 12 to FIG. 14. Note that, since the system including a print control apparatus according to the fifth embodiment is the same as that of the aforesaid third embodiment shown in FIG. 8, the structure of the fifth embodiment will be described using FIG. 8.

Operation of a printer control program operating on the host computer 1 of the print control apparatus according to the fifth embodiment will be described with reference to the flowchart of FIG. 12. In FIG. 12, first, the host computer 1 acquires the printer type information of the printer 2 therefrom in step S1201. In step S1202, a determination is made as to whether the printer type information of the printer 2 has been acquired or not. When the printer type information of the printer 2 has been acquired, the process goes to step S1203, whereas, when it has not been acquired, the process goes to step S1211, respectively. In step S1203, reference is made to the portion of the printer type information acquired at step S1201 that shows the model name of the printer 2, and the model name of the printer 2 is compared with the model name of a printer which is assumed by image drawing commands which the host computer 1 intends to transmit to the printer 2. Next, it is determined in step S1204 whether the models names of the printers coincided with each other, in the comparison in step S1203. When the model names coincide with each other, the process goes to step S1205, whereas when they do not coincide with each other, the process goes to step S1206, respectively.

Since processing in step S1205 is carried out when all the image drawing commands intended to be transmitted are supported by the printer 2, the image drawing commands are transmitted to the printer 2 in step S1205, and then the processing operation is finished. Since processing in step S1206 is carried out when there is a possibility that all the image drawing commands intended to be transmitted are not supported by the printer 2, reference is made to the portion of the printer type information acquired at step S1201 that shows the type of an image drawing command set which is recognizable by the printer, and the type of the image drawing command set is compared with the type of the image drawing commands which the host computer 1 intends to transmit to the printer 2, and then the process goes to step S1207.

In step S1207, a determination is made as to whether or not the printer 2 supports the image drawing commands which the host computer 1 intends to transmit to the printer 2, based on the result of comparison made in step S1206. When the printer 2 supports the image drawing commands, the process goes to step S1208, whereas when the printer 2 does not support the image drawing commands, the process goes to step S1209, respectively. The processing in step S1208 is carried out if the printer 2 can recognize the image drawing commands which the host computer 1 intends to transmit to some degree, although the printer 2 does not assume the image drawing commands. If all the image drawing commands are unconditionally transmitted to the printer 2, there is a possibility that, when some image drawing commands included therein cannot be recognized by the printer 2, a page including the commands cannot be properly printed, or even that all the pages subsequent to the commands will be improperly printed. Thus, pages must be transmitted selectively.

Accordingly, in step S1208, only the image drawing commands by which pages can be properly printed are selected from the image drawing commands which the host computer 1 intends to transmit to the printer 2, and the data of the pages other than the above pages is deleted. Thereafter, the process goes to step S1205 and transmits the image drawing commands to the printer 2, and the processing operation is finished. A warning is issued in step S1209 that the printer 2 does not support the image drawing commands which the host computer 1 intends to transmit to the printer 2 and the process goes to next step S1210. At step S1210, whether the user requests to interrupt the print processing or not is determined. When the user requests the interruption of the print processing, the processing operation is finished without carrying out further processing. Whereas, when the user does not request the interruption of the print processing, step S1201 and the subsequent steps are repeated.

Since processing in step S1211 is carried out when the printer type information of the printer 2 cannot be obtained therefrom, that condition is conveyed to the user as a warning in step S1211, and then the process goes to step S1212. In step S1212, a determination is made as to whether the user requests to interrupt the print processing or not. When the user requests interruption of the print processing, the processing operation is ended, whereas, when the user does not request interruption of the print processing, step S1201 and the subsequent steps are repeated.

Next, the processing executed in step S1208 in FIG. 12 to select transmittable pages will be described with reference to the flowchart in FIG. 13. In FIG. 13, first, reference is made to the portion of the printer type information acquired in step S1201 in FIG. 12 that shows the model name of the printer 2. Based on that information, the command table of the printer stored in the hard disk 8 of the host computer 1 is read out. The command table referred to here records all the image drawing commands which can be recognized by the respective types of printer and is composed of a data format as shown in FIG. 14. The recognizable image drawing commands recorded in the command table record the commands which the printer 2 can recognize among the various commands prepared in the command set, different from the type information of the image drawing command set which is included in printer type information of the printer acquired in step S1201 in FIG. 12 and recognizable by the printer 2.

In step S1302, 0 is set as the value of a page counting primary variable n, and 1 is added to n at next step S1303. Thereafter, in step S1304, it is examined whether any of the commands included in an n-th page of the image drawing commands which the host computer 1 intends to transmit to the printer 2 is not included in the command table read out in step S1301. In step 1305, it is determined whether any image drawing command is not included in the command table read out in step S1301 as a result of the scanning of the image drawing commands included in the n-th page which has been executed at step S1304. When there is no image drawing command on the n-th page which is not included in the command table, the process goes to step S1306, whereas when there is an image drawing command on the n-th page which is not included in the command table, the process goes to step S1307, respectively.

In step S1306, it is determined whether the processing of step S1304 has been executed on all the pages which the host computer 1 intends to transmit to the printer 2. When that processing has been executed for all the pages, the transmission page selection processing is finished and the process returns, whereas otherwise, step S1303 and the subsequent steps are repeated.

When the data of the n-th page is transmitted to the printer 2, there is a possibility that a proper printing result cannot be obtained. Thus, the data of the n-th page is deleted in step S1307, and the process goes to step S1306 and determines whether the processing at step S1304 has been finished or not.

As described above, when the host computer 1 transmits the image drawing commands to the printer 2, the host computer 1 acquires the printer type information of the printer 2 therefrom and compares the model name of the printer 2 included in the thus acquired printer type information with the model name of the printer assumed by image drawing commands which the host computer 1 intends to transmit to the printer 2. When the model names do not coincide with each other and the type of the image drawing command set coincides with the image drawing commands, the pages in the data intended to be transmitted which include the image drawing commands unrecognizable by the printer 2 are not transmitted, and only the other pages are transmitted. With this operation, even if the model names of the printers do not coincide with each other, the pages which can be printed properly, are printed, and the data of the pages which cannot be printed is not transmitted to the printer 2. As a result, the time-consuming job for the user of carrying out the print operation again for all the pages can be avoided as well as the waste of print paper, ink, toner and the like which would be caused by the transmission of the data which is unsuitable for the printer.

Note that the print control method of the present invention is applicable not only to a system composed of a plurality of devices but also to a system composed of a single device. Further, it is needless to say that the print control method of the present invention is also applicable to a case where it can be achieved by supplying a program to a system or an apparatus. In this case, the system or the apparatus can obtain the advantage of the present invention by reading out from a memory medium to be described below, a program represented by software for achieving the present invention, and executing same in the system or the apparatus.

(Sixth Embodiment)

Figure 15:
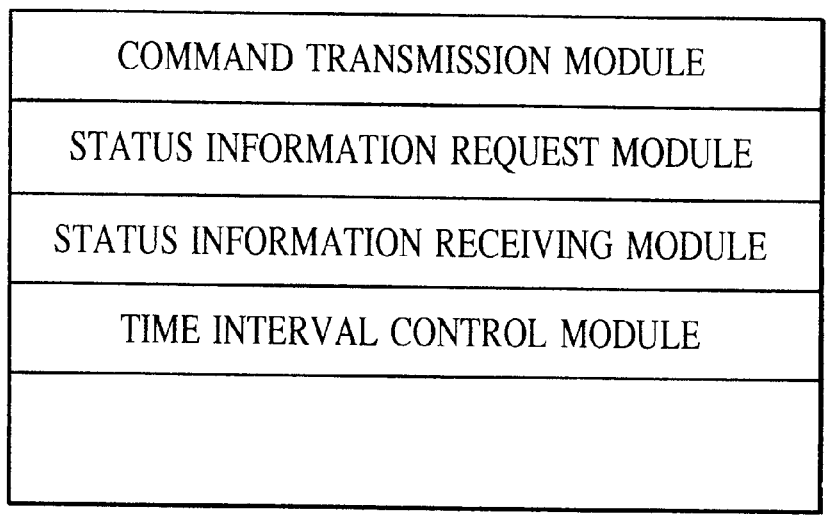
FIG. 15 is a view showing a program module stored in a memory medium used to the print control method and the print control apparatus of the present invention.

A memory medium used to the print method and the print apparatus of the present invention will be described below with reference to FIG. 15 to FIG. 18. As shown in FIG. 15, it is sufficient that a memory medium, in which is stored a control program for controlling the print control apparatus for transferring data to the printer according to the first and second embodiments, stores the program codes of the respective program modules of at least a "command transmission module", a "status information request module", a "status information reception module", and a "time interval control module".

The "command transmission module" is a program module for transmitting a status request setting command to the printer to cause it to create printer status information; the "status information request module" is a program module for requesting the printer to transmit the printer status information; the "status information reception module" is a program module for receiving the printer status information transmitted from the printer; and the "time interval control module" is a program module for controlling a time interval at which the transmission of the status information is requested to the printer in accordance with the operating status thereof.

Figure 16:
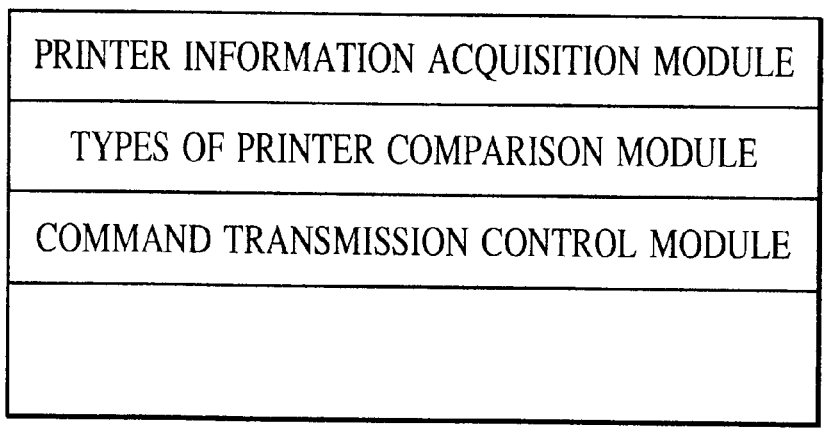
FIG. 16 is a view showing a program module, which is different from that shown in FIG. 15, stored in the memory medium used to the print control method and the print control apparatus of the present invention.

As shown in FIG. 16, it is sufficient that a memory medium, in which is stored a control program for controlling the print control apparatus for transferring data to the printer according to the third embodiment, stores the program codes of the respective program modules of at least a "printer information acquisition module", a "printer model name comparison module" and a "command transmission control module".

The "printer information acquisition module" is a program module for acquiring the printer type information of the printer therefrom; the "printer model name comparison module" is a program module for comparing the model name of the printer included in the printer type information acquired from the printer with the model name of a printer which is assumed by image drawing commands which are intended to be transmitted to the printer; and the "command transmission control module" is a program module for controlling whether the image drawing commands are transmitted or not in accordance with the result of comparison of the model names.

Figure 17:
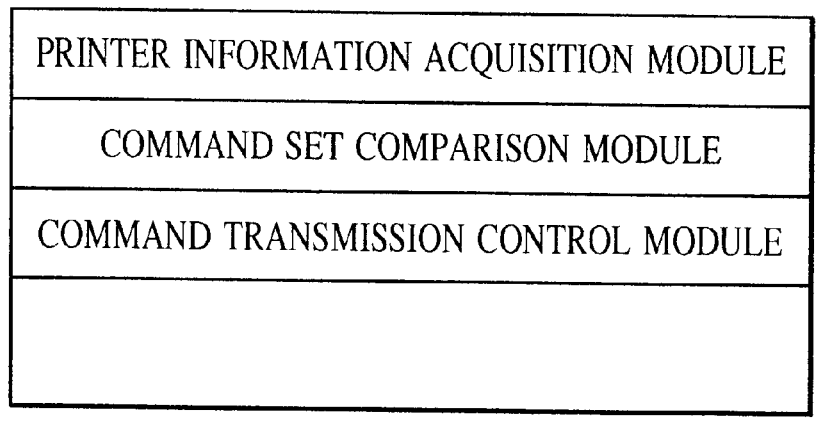
FIG. 17 is a view showing a program module, which is different from those shown in FIG. 15 and FIG. 16, stored in the memory medium used to the print control method and the print control apparatus of the present invention.

As shown in FIG. 17, it is sufficient that a memory medium, in which is stored a control program for controlling a print control apparatus for transferring data to the printer according to the fourth embodiment, stores the program codes of the respective program modules of at least a "printer information acquisition module", a "command set comparison module" and a "command transmission control module".

The "printer information acquisition module" is a program module for acquiring the printer type information of the printer therefrom; the "command set comparison module" is a program module for comparing the type information of an image drawing command set which is included in the printer type information acquired from the printer and recognizable by the printer with the type information of image drawing commands which are intended to be transmitted to the printer; and the "command transmission control module" is a program module for controlling whether the image drawing commands are transmitted or not in accordance with the result of comparison of the command sets.

Figure 18:
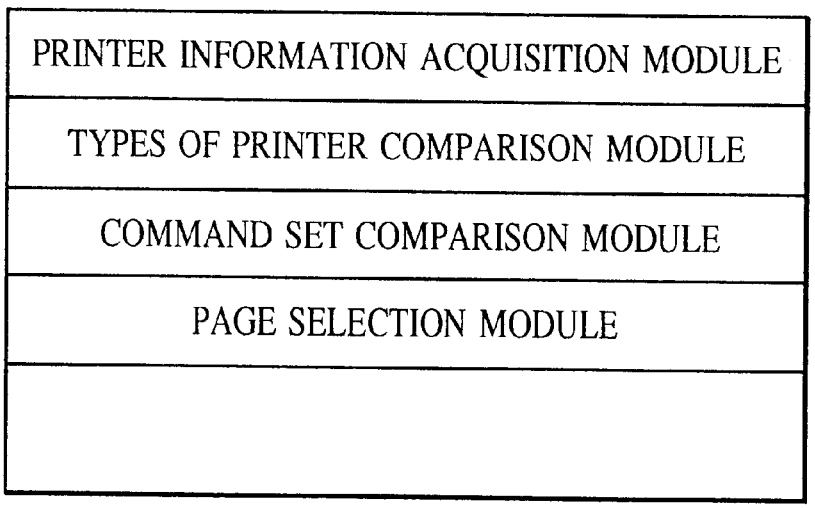
FIG. 18 is a view showing a program module, which is different from those shown in FIG. 15 to FIG. 17, stored in the memory medium used to the print control method and t he print control apparatus of the present invention.

As shown in FIG. 18, it is sufficient that a memory medium, in which is stored a control program for controlling the print control apparatus for transferring data to the printer according to the fifth embodiment, stores the program codes of the respective program modules of at least a "printer information acquisition module", a "model name comparison module", a "command set comparison module" and a "page selection module".

The "printer information acquisition module" is a program module for acquiring the type of a printer therefrom; the "printer model name comparison module" is a program module for comparing the model name of the printer included in type information of the printer acquired from the printer with the model name of a printer which is assumed by image drawing commands which are intended to be transmitted to the printer; the "command set comparison module" is a program module for comparing the type information of an image drawing command set which is included in the printer type information acquired from the printer and recognizable by the printer with the type information of image drawing commands which are intended to be transmitted to the printer; and the "page selection module" is a program module for selecting an image page which can be recognized by the printer when the model name of the printer acquired therefrom does not coincide with the model name of a printer which is assumed by the image drawing commands which are intended to be transmitted to the printer and the type information of an image drawing command set which is recognized by the printer coincides with the type information of the image drawing commands which are intended to be transmitted to the printer.

As described above in detail, according to the print control method and the print control apparatus of the present invention, there can be obtained advantages that the status information of a printer can be recognized, a time interval at which the transmission of the status information is suitably requested from the printer, can be selected from a plurality of time intervals which are preset in accordance with the status of the printer, a time lag between the change of status of the printer-and the status information of the printer displayed by the print control apparatus can be reduced, and the deterioration of performance of the print control apparatus and the printer can be avoided.

Further, according to the print control method and the print control apparatus of the present invention, there can be obtained advantages that the printer type information of a connected printer and the information of image drawing commands set recognized by the printer can be recognized, whether image drawing commands are transmitted or not can be controlled depending upon whether the model name of the connected printer coincides with the model name of a printer which is designated by the user in print operation and whether the image drawing command set which is recognized by the connected printer coincides with an image drawing command set which is intended to be transmitted, the transmission of improper image drawing commands to the printer can be prevented, and it can be prevented that proper image drawing commands are not transmitted to the printer.

What is claimed is:

1. A status request method comprising the steps of:
   discriminating whether a peripheral apparatus is in an error condition;
   establishing a first time interval, when the peripheral apparatus is discriminated not to be in an error condition in the discriminating step, or a second time interval that is shorter than the first time interval, when the peripheral apparatus is discriminated to be in an error condition in the discrimination step; and
   sending a request for the transmission of status information to the peripheral apparatus at the first time interval or the second time interval established in the establishment step.

2. The status request method according to claim 1, further comprising the steps of:
   receiving the status information from the peripheral apparatus;
   judging whether the status of the peripheral apparatus has changed; and
   updating the discrimination step according to a judgement rendered in the judging step.

3. The status request method according to claim 1, further comprising the step of:
   displaying the status of the peripheral apparatus as a function of the information received by the peripheral apparatus.

4. The status request method according to claim 1, further comprising the step of discriminating the condition of a printer device.

5. A status request method according to claim 1,
   wherein said request step is executed by shifting from a compatibility mode to a nibble mode.

6. A status request method according to claim 1,
   wherein said request step is executed by shifting from a compatibility mode to a byte mode.

7. An information processing apparatus connected to a peripheral apparatus, comprising:
   a discrimination unit adapted to discriminate whether the peripheral apparatus is in an error condition;
   an establishment unit adapted to establish a first time, when the peripheral apparatus is discriminated not to be in an error condition by the discrimination unit, or a second time that is shorter than the first time, when the peripheral apparatus discriminated to be in an error condition by the discrimination unit;
   a requesting element adapted to send a request for the transmission of status information to the peripheral apparatus at the first time interval or second time interval established by the establishment unit.

8. An information processing apparatus according to claim 7, further comprising:
   a judgement unit adapted to receive the status information from the peripheral apparatus, and judging whether the status of the peripheral apparatus has changed, wherein said discrimination unit updates the status of the peripheral apparatus according to a judgement rendered by the judgement unit.

9. An information precessing apparatus according to claim 7, further comprising:
   a display unit adapted to display the status of the peripheral apparatus, that is based on the information received by the peripheral apparatus.

10. An information processing apparatus according to claim 1, wherein the peripheral apparatus includes a printer.

11. An information processing apparatus according to claim 7,
    wherein said requesting unit operates by shifting from a compatibility mode to a nibble mode.

12. An information processing apparatus according to claim 7,
    wherein said requesting unit operates by shifting from a compatibility mode to a byte mode.

13. A storage medium storing a program to control an information processing apparatus connected to a peripheral apparatus, the program comprising the steps of:
    discriminating whether the peripheral apparatus is in an error condition;
    establishing a first time interval, when the peripheral apparatus is discriminated not to be in an error condition, in the discriminating step or a second time interval that is shorter than the first time interval, when the peripheral apparatus is discriminated to be in an error condition in the discrimination step;
    sending a request for the transmission of status information to the peripheral apparatus at the first time interval or the second time interval establishment step.

14. A storage medium according to claim 13, wherein the program further comprises the steps of:
    receiving the status information from the peripheral apparatus;
    judging whether the status of the peripheral apparatus has changed;
    updating the discrimination step according to a judgement rendered in the judging step.

15. The storage medium according to claim 13, wherein the program further comprises the step of:
    displaying the status of the first peripheral apparatus as a function of the information received by the second peripheral apparatus.

16. The storage medium according to claim 13, further comprising the step of discriminating the condition of a printer device.

17. A storage medium according to claim 13,
    wherein said requesting step is executed by shifting from a compatibility mode to a nibble mode.

18. A storage medium according to claim 13,
    wherein said requesting step is executed by shifting from a compatibility mode to a byte mode.

19. A computer readable storage medium storing a program for executing a method operative in an information processing apparatus, the program comprising:
    code for discriminating whether a peripheral apparatus is in an error condition;
    code for establishing a first time interval, when the peripheral apparatus is discriminated not to be in an error condition in the discriminating step, or a second time interval that is shorter than the first time interval, when the peripheral apparatus is discriminated to be in an error condition in the discrimination step; and code for sending a request for the transmission of status information to the peripheral apparatus at the first time interval or the second time interval established in the establishment step.

20. A computer readable storage medium storing a program for executing a method according to claim 19, the program further comprising:

code for receiving the status information from the peripheral apparatus;

code for judging whether the status of the peripheral apparatus has changed; and code for updating the discrimination step according to a judgement rendered in the judging step.

21. The program according to according to claim 19, further comprising code for displaying the status of the peripheral apparatus, as a function of the information received by the peripheral apparatus.

22. The program according to claim 19, further comprising code for discriminating the condition of a printer device.

23. A computer readable storage medium according to claim 19, wherein said code for requesting executes to shift from a compatibility mode to a nibble mode.

24. A computer readable storage medium according to claim 19, wherein said code for requesting executes to shift from a compatibility mode to a byte mode.

25. A status request method comprising the steps of:

transmitting a status request setting command to a peripheral apparatus;

discriminating whether the peripheral apparatus is in an error condition;

setting a first time interval, when the peripheral apparatus is discriminated not to be in an error condition in the discriminating step, or a second time interval that is shorter than first time interval, when the peripheral apparatus is discriminated to be in an error condition in the discriminating step; and sending a request for the transmission of status information to the peripheral apparatus based on the first time interval or the second time interval set in the setting step.

26. The status request method according to claim 25, wherein the requesting of the transmission of status information is executed by shifting from a first mode for executing communication from a host apparatus to the peripheral apparatus to a second mode for executing communication from peripheral apparatus to the host apparatus.

27. The status request method according to claim 25, wherein the printer transmits a status based on the requesting transmission of status after receiving the status request setting command.

28. A status request apparatus connectable to a peripheral apparatus, comprising:

a transmission unit for transmitting a status request setting command to a peripheral apparatus;

a discriminating unit for discriminating whether the peripheral apparatus is in an error condition;

a setting element for setting a first time interval, when the peripheral apparatus is discriminated not to be in an error condition by the discriminating unit, or a second time interval that is shorter than a first time interval, when the peripheral apparatus is discriminated to be in an error condition by the discriminating unit; and a requesting element for sending a request for the transmission of status information to the peripheral apparatus based on the first time interval or the second time interval set in the setting step.

29. The status request apparatus according to claim 28, wherein the requesting of the transmission of status information by the requesting element is executed by shifting from a first mode for executing communication from a host apparatus to the peripheral apparatus to a second mode for executing communication from peripheral apparatus to the host apparatus.

30. The status request apparatus according to claim 28, wherein the printer transmits a status based on the requesting element requesting transmission of status after receiving the status request setting command.

31. A computer readable storage medium storing computer-executable program for executing a status request method, the program comprising the steps of:

code for transmitting a status request setting command to a peripheral apparatus;

code for discriminating whether the peripheral apparatus is in an error condition;

code for setting a first time interval, when the peripheral apparatus is discriminated not to be in an error condition in the discriminating step, or a second time interval that is shorter than the first time interval, when the peripheral apparatus is discriminated to be in an error condition in the discriminating step; and code for sending a request for the transmission of status information to the peripheral apparatus based on the first time interval or the second time interval set in the setting step.

32. The computer readable storage medium according to claim 31, wherein the requesting of the transmission of status information is executed by shifting from a first mode for executing communication from a host apparatus to the peripheral apparatus to a second mode for executing communication from peripheral apparatus to the host apparatus.

33. The computer readable storage medium according to claim 31, wherein the printer transmits a status based on the requesting transmission of status after receiving the status request setting command.

* * * * *

UNITED STATES PATENT AND TRADEMARK OFFICE
CERTIFICATE OF CORRECTION

PATENT NO. : 6,587,971 B1
DATED : July 1, 2003
INVENTOR(S) : Hiroshi Kai

It is certified that error appears in the above-identified patent and that said Letters Patent is hereby corrected as shown below:

Column 1,
Line 39, "printed," should be deleted.

Column 6,
Line 34, "t" should read -- the --; and
Line 35, "he" should be deleted.

Column 11,
Line 65, "operation,.the" should read -- operation, the --.

Column 21,
Line 18, "according to" (second occurrence) should be deleted.

Signed and Sealed this

Tenth Day of February, 2004

JON W. DUDAS
*Acting Director of the United States Patent and Trademark Office*